(12) United States Patent
Panguluri

(10) Patent No.: US 11,574,623 B2
(45) Date of Patent: *Feb. 7, 2023

(54) AUDIO STREAMING OF TEXT-BASED ARTICLES FROM NEWSFEEDS

(71) Applicant: Gracenote Digital Ventures, LLC, New York, NY (US)

(72) Inventor: Venkatarama Anilkumar Panguluri, Milpitas, CA (US)

(73) Assignee: Gracenote Digital Ventures, LLC, Emeryville, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/738,790

(22) Filed: May 6, 2022

(65) Prior Publication Data

US 2022/0262338 A1 Aug. 18, 2022

Related U.S. Application Data

(63) Continuation of application No. 17/384,150, filed on Jul. 23, 2021, now Pat. No. 11,367,430, which is a
(Continued)

(51) Int. Cl.
*G10L 13/08* (2013.01)
*G10L 13/04* (2013.01)
(Continued)

(52) U.S. Cl.
CPC .............. *G10L 13/08* (2013.01); *G10L 13/04* (2013.01); *H04L 65/612* (2022.05); *H04L 67/01* (2022.05); *H04L 67/12* (2013.01)

(58) Field of Classification Search
CPC ......... G10L 13/08; G10L 13/04; H04L 67/01; H04L 65/612; H04L 67/12
See application file for complete search history.

(56) References Cited

U.S. PATENT DOCUMENTS 5,712,625 A 1/1998 Murphy
6,345,250 B1 2/2002 Martin
(Continued)

FOREIGN PATENT DOCUMENTS

JP 2010130172 6/2010
KR 1020100000249 1/2010
(Continued)

OTHER PUBLICATIONS

Australian Government, IP Australia, Notice of Acceptance for Patent Application dated Dec. 14, 2017, issued in connection with Australian Application No. 2014385236, 3 pages.
Final Office Action dated Jun. 5, 2018, issued in connection with U.S. Appl. No. 15/223,278, filed Jul. 29, 2016, 22 pages.
(Continued)

*Primary Examiner* — Quang N Nguyen
*Assistant Examiner* — Billy H Ng
(74) *Attorney, Agent, or Firm* — McDonnell Boehnen Hulbert & Berghoff LLP

(57) ABSTRACT

An example embodiment may involve receiving, from a client device, a selection of text-based articles from newsfeeds. The selection may specify that the text-based articles have been flagged for audible playout. The example embodiment may also involve, possibly in response to receiving the selection of the text-based articles, retrieving text-based articles from the newsfeeds. The example embodiment may also involve causing the text-based articles to be converted into audio files. The example embodiment may also involve receiving a request to stream the audio files to the client device or another device. The example embodiment may also involve causing the audio files to be streamed to the client device or the other device.

20 Claims, 10 Drawing Sheets

Related U.S. Application Data continuation of application No. 16/730,358, filed on Dec. 30, 2019, now Pat. No. 11,107,458, which is a continuation of application No. 15/387,327, filed on Dec. 21, 2016, now Pat. No. 10,565,980.

(51) Int. Cl.
  *H04L 65/612* (2022.01)
  *H04L 67/01* (2022.01)
  *H04L 67/12* (2022.01)

(56) References Cited

U.S. PATENT DOCUMENTS

| | | |
|---|---|---|
| 6,351,679 B1 | 2/2002 | Ainslie |
| 6,438,450 B1 | 8/2002 | DiLorenzo |
| 6,460,036 B1 | 10/2002 | Herz |
| 6,609,253 B1 | 8/2003 | Swix et al. |
| 6,721,781 B1 | 4/2004 | Bates et al. |
| 6,738,972 B1 | 5/2004 | Willard et al. |
| 6,766,523 B2 | 7/2004 | Herley |
| 6,938,209 B2 | 8/2005 | Ogawa et al. |
| 7,006,967 B1 | 2/2006 | Kahn et al. |
| 7,013,478 B1 | 3/2006 | Hendricks et al. |
| 8,036,646 B1 | 10/2011 | Delker et al. |
| 8,281,344 B1 | 10/2012 | Mathias |
| 8,364,757 B2 | 1/2013 | Scott |
| 8,373,768 B2 | 2/2013 | Bill |
| 8,669,457 B2 | 3/2014 | Ringewald |
| 8,886,655 B1 | 11/2014 | Nandy |
| 8,977,374 B1 | 3/2015 | Eck et al. |
| 8,984,147 B1 | 3/2015 | Kret et al. |
| 9,002,703 B1 | 4/2015 | Crosley |
| 9,105,300 B2 | 8/2015 | Resch |
| 9,143,718 B2 | 9/2015 | Nagorski et al. |
| 9,213,705 B1 | 12/2015 | Story |
| 9,285,947 B1 | 3/2016 | Story |
| 9,286,942 B1 | 3/2016 | Hayes |
| 9,355,174 B2 | 5/2016 | Moss et al. |
| 9,380,383 B2 | 6/2016 | Brenner et al. |
| 9,431,002 B2 | 8/2016 | Panguluri et al. |
| 9,454,342 B2 | 9/2016 | Panguluri et al. |
| 9,665,169 B1 | 5/2017 | Dai et al. |
| 9,798,509 B2 | 10/2017 | Panguluri et al. |
| 9,804,816 B2 | 10/2017 | Panguluri et al. |
| 9,959,343 B2 | 5/2018 | Sharma et al. |
| 10,069,886 B1 | 9/2018 | Lundsgaard |
| 2001/0056348 A1 | 12/2001 | Hyde-Thomson et al. |
| 2002/0002032 A1 | 1/2002 | Fleenor |
| 2002/0091524 A1 | 7/2002 | Guedalia et al. |
| 2002/0130898 A1 | 9/2002 | Ogawa et al. |
| 2003/0032419 A1 | 2/2003 | Shibasaki et al. |
| 2003/0070182 A1 | 4/2003 | Pierre et al. |
| 2003/0093784 A1 | 5/2003 | Dimitrova et al. |
| 2003/0130894 A1 | 7/2003 | Huettner et al. |
| 2003/0132953 A1 | 7/2003 | Johnson et al. |
| 2003/0151618 A1 | 8/2003 | Johnson et al. |
| 2003/0158735 A1 | 8/2003 | Yamada et al. |
| 2003/0217061 A1 | 11/2003 | Agassi |
| 2003/0217121 A1 | 11/2003 | Willis |
| 2003/0236905 A1 | 12/2003 | Choi et al. |
| 2004/0215718 A1 | 10/2004 | Kazmi et al. |
| 2004/0237759 A1 | 12/2004 | Bill |
| 2004/0260835 A1 | 12/2004 | Welk et al. |
| 2005/0021500 A1 | 1/2005 | Plastina et al. |
| 2005/0033582 A1 | 2/2005 | Gadd et al. |
| 2005/0097613 A1 | 5/2005 | Ulate et al. |
| 2005/0125148 A1 | 6/2005 | Van Buer et al. |
| 2005/0125232 A1 | 6/2005 | Gadd |
| 2005/0174889 A1 | 8/2005 | Marcantonio et al. |
| 2005/0182675 A1 | 8/2005 | Huettner |
| 2006/0020609 A1 | 1/2006 | LaChapelle et al. |
| 2006/0085182 A1 | 4/2006 | Eves et al. |
| 2006/0085814 A1 | 4/2006 | Okamoto et al. |
| 2006/0092282 A1 | 5/2006 | Herley et al. |
| 2006/0116965 A1 | 6/2006 | Kudo et al. |
| 2006/0143236 A1 | 6/2006 | Wu |
| 2006/0168507 A1 | 7/2006 | Hansen |
| 2006/0195513 A1 | 8/2006 | Rogers et al. |
| 2006/0236847 A1 | 10/2006 | Withop |
| 2006/0265421 A1 | 11/2006 | Ranasinghe et al. |
| 2006/0294212 A1 | 12/2006 | Kikkawa et al. |
| 2007/0016865 A1 | 1/2007 | Johnson et al. |
| 2007/0022156 A1 | 1/2007 | Grubbs |
| 2007/0036289 A1 | 2/2007 | Fu et al. |
| 2007/0050184 A1 | 3/2007 | Drucker et al. |
| 2007/0078729 A1 | 4/2007 | Brown |
| 2007/0192613 A1 | 8/2007 | Amoroso et al. |
| 2007/0198353 A1 | 8/2007 | Behringer et al. |
| 2007/0294222 A1 | 12/2007 | Laurila et al. |
| 2008/0005167 A1 | 1/2008 | Jania et al. |
| 2008/0028094 A1 | 1/2008 | Kang |
| 2008/0046948 A1 | 2/2008 | Verosub |
| 2008/0092182 A1 | 4/2008 | Conant |
| 2008/0133525 A1 | 6/2008 | Ott |
| 2008/0182670 A1 | 7/2008 | Amron |
| 2008/0189099 A1 | 8/2008 | Friedman et al. |
| 2008/0190267 A1 | 8/2008 | Rechsteiner et al. |
| 2008/0195664 A1 | 8/2008 | Maharajh et al. |
| 2008/0215624 A1 | 9/2008 | Ohashi |
| 2008/0235589 A1 | 9/2008 | Shaw |
| 2008/0256129 A1 | 10/2008 | Salinas et al. |
| 2008/0268772 A1 | 10/2008 | Linnamaki et al. |
| 2009/0063511 A1 | 3/2009 | Myers et al. |
| 2009/0099846 A1 | 4/2009 | Pickering |
| 2009/0125321 A1 | 5/2009 | Charlebois et al. |
| 2009/0158342 A1 | 6/2009 | Mercer et al. |
| 2009/0164429 A1 | 6/2009 | Svendsen et al. |
| 2009/0182704 A1 | 7/2009 | Haskey et al. |
| 2009/0204243 A1 | 8/2009 | Marwaha et al. |
| 2009/0221248 A1 | 9/2009 | Ellis |
| 2009/0222531 A1 | 9/2009 | London et al. |
| 2009/0276064 A1 | 11/2009 | Van Gassel |
| 2009/0326953 A1 | 12/2009 | Peralta et al. |
| 2010/0004768 A1 | 1/2010 | Dunning et al. |
| 2010/0063818 A1 | 3/2010 | Mason et al. |
| 2010/0069054 A1 | 3/2010 | Labidi et al. |
| 2010/0070862 A1 | 3/2010 | Partovi |
| 2010/0082346 A1 | 4/2010 | Rogers et al. |
| 2010/0095333 A1 | 4/2010 | Kelly |
| 2010/0114853 A1 | 5/2010 | Fisher et al. |
| 2010/0129058 A1 | 5/2010 | Koyano |
| 2010/0241963 A1 | 9/2010 | Kulis et al. |
| 2010/0251098 A1 | 9/2010 | Rehki et al. |
| 2010/0268821 A1 | 10/2010 | Pau |
| 2010/0322413 A1 | 12/2010 | Matsushima et al. |
| 2011/0022594 A1 | 1/2011 | Takatsuka et al. |
| 2011/0066941 A1 | 3/2011 | Chipchase |
| 2011/0112671 A1 | 5/2011 | Weinstein |
| 2011/0123176 A1 | 5/2011 | Fujiwara et al. |
| 2011/0167390 A1 | 7/2011 | Reed, Jr. et al. |
| 2011/0320443 A1 | 12/2011 | Ray et al. |
| 2012/0057842 A1 | 3/2012 | Caligor et al. |
| 2012/0110126 A1 | 5/2012 | Sparks |
| 2012/0123639 A1 | 5/2012 | Ochiai |
| 2012/0130817 A1 | 5/2012 | Bousaleh et al. |
| 2012/0159336 A1 | 6/2012 | Norwood |
| 2012/0185070 A1 | 7/2012 | Hagg et al. |
| 2012/0203838 A1 | 8/2012 | Zuckerberg |
| 2012/0240045 A1 | 9/2012 | Bradley et al. |
| 2012/0245982 A1 | 9/2012 | Daniel |
| 2012/0253952 A1 | 10/2012 | Rafenomanjato |
| 2013/0022131 A1 | 1/2013 | Ocon et al. |
| 2013/0024287 A1 | 1/2013 | MacNeille |
| 2013/0103496 A1 | 4/2013 | Shekar et al. |
| 2013/0109340 A1 | 5/2013 | Williams |
| 2013/0198268 A1 | 8/2013 | Hyman |
| 2013/0216055 A1 | 8/2013 | Wanca |
| 2013/0231931 A1 | 9/2013 | Kulis et al. |
| 2013/0253833 A1 | 9/2013 | Tuukkanen |
| 2013/0297599 A1 | 11/2013 | Henshall |
| 2013/0302011 A1 | 11/2013 | Nagorski et al. |
| 2013/0304822 A1 | 11/2013 | Tetreault |
| 2014/0006559 A1 | 1/2014 | Drapeau et al. |
| 2014/0052770 A1 | 2/2014 | Gran et al. |

(56) References Cited

U.S. PATENT DOCUMENTS

| | | |
|---|---|---|
| 2014/0074846 A1 | 3/2014 | Moss et al. |
| 2014/0108141 A1 | 4/2014 | Zigler et al. |
| 2014/0115463 A1 | 4/2014 | Reznor et al. |
| 2014/0122080 A1 | 5/2014 | Kaszczuk et al. |
| 2014/0178043 A1 | 6/2014 | Kritt et al. |
| 2014/0245155 A1 | 8/2014 | Jeon et al. |
| 2014/0281973 A1 | 9/2014 | Klappert et al. |
| 2014/0281976 A1 | 9/2014 | Chia et al. |
| 2014/0282755 A1 | 9/2014 | Alsina et al. |
| 2014/0366047 A1 | 12/2014 | Thomas et al. |
| 2015/0062623 A1 | 3/2015 | Yano et al. |
| 2015/0254050 A1* | 9/2015 | Panguluri ............ H04N 21/6125 700/94 |
| 2015/0254051 A1 | 9/2015 | Panguluri et al. |
| 2015/0255055 A1 | 9/2015 | Panguluri |
| 2015/0255056 A1 | 9/2015 | Panguluri et al. |
| 2015/0262229 A1 | 9/2015 | Brenner et al. |
| 2015/0334170 A1 | 11/2015 | Panguluri |
| 2015/0348532 A1 | 12/2015 | Cameron et al. |
| 2015/0373138 A1 | 12/2015 | Brenner et al. |
| 2016/0066004 A1 | 3/2016 | Lieu et al. |
| 2016/0066140 A1 | 3/2016 | Gnanasekaran |
| 2016/0070527 A1 | 3/2016 | Ricci |
| 2016/0170814 A1* | 6/2016 | Li ............................ G06Q 10/10 719/318 |
| 2016/0179087 A1 | 6/2016 | Lee |
| 2016/0259830 A1 | 9/2016 | Li et al. |
| 2016/0328471 A1 | 11/2016 | Goldin et al. |
| 2016/0373197 A1 | 12/2016 | Brenner et al. |
| 2017/0006128 A1 | 1/2017 | Graham-Cumming et al. |
| 2017/0041680 A1 | 2/2017 | Lewis et al. |
| 2017/0075701 A1 | 3/2017 | Ricci et al. |
| 2017/0115952 A1 | 4/2017 | Gregory |
| 2017/0187862 A1 | 6/2017 | Rahman et al. |
| 2017/0300293 A1* | 10/2017 | Zhao ........................ G10L 13/06 |
| 2017/0344336 A1 | 11/2017 | Lotfizadeh |
| 2018/0088777 A1 | 3/2018 | Daze et al. |
| 2018/0096064 A1 | 4/2018 | Lennon et al. |
| 2018/0137381 A1 | 5/2018 | McNabb et al. |

FOREIGN PATENT DOCUMENTS

| | | |
|---|---|---|
| KR | 1020110117496 | 10/2011 |
| KR | 1020140014664 | 2/2014 |
| KR | 10-2014-0126556 | 10/2014 |
| KR | 1020140126556 | 10/2014 |
| WO | 2005/050652 | 6/2005 |
| WO | 2015/134094 | 9/2015 |
| WO | 2015/134097 A1 | 9/2015 |
| WO | 2015/134102 | 9/2015 |
| WO | 2015/134104 | 9/2015 |
| WO | 2015/138601 | 9/2015 |
| WO | 2017/120008 A1 | 7/2017 |
| WO | 2017/120009 A1 | 7/2017 |

OTHER PUBLICATIONS

Final Office Action dated Apr. 20, 2018, issued in connection with U.S. Appl. No. 15/043,073, filed Feb. 12, 2016, 27 pages.
Non-Final Office Action dated Apr. 3, 2018, issued in connection with U.S. Appl. No. 15/043,059, filed Feb. 12, 2016, 28 pages.
Notice of Allowance dated Mar. 22, 2018, issued in connection with U.S. Appl. No. 15/043,085, filed Feb. 12, 2016, 9 pages.
Notice of Allowance dated May 31, 2018, issued in connection with U.S. Appl. No. 15/387,345, filed Dec. 21, 2016, 10 pages.
Non-Final Office Action dated Jan. 22, 2019, issued in connection with U.S. Appl. No. 15/387,351, filed Dec. 21, 2016, 27 pages.
Notice of Allowance dated Feb. 1, 2019, issued in connection with U.S. Appl. No. 16/002,454, filed Jun. 7, 2018, 10 pages.
Australian Government, IP Australia, Notice of Acceptance for Patent Application dated Aug. 10, 2017, issued in connection with Australian Application No. 2014385186, 3 pages.
European Patent Office, Supplementary European Search Report dated Jul. 13, 2017, issued in European Application No. 14884483, 11 pages.
Non-Final Office Action dated Sep. 11, 2017, issued in connection with U.S. Appl. No. 15/043,073, filed Feb. 12, 2016, 24 pages.
Final Office Action dated Jan. 8, 2016, issued in connection with U.S. Appl. No. 14/196,908, filed Mar. 4, 2014, 50 pages.
Advisory Action dated Mar. 18, 2016, issued in connection with U.S. Appl. No. 14/196,908, filed Mar. 4, 2014, 3 pages.
Advisory Action dated Apr. 26, 2016, issued in connection with U.S. Appl. No. 14/196,932, filed Mar. 4, 2014, 8 pages.
Advisory Action dated Mar. 28, 2016, issued in connection with U.S. Appl. No. 14/196,774, filed Mar. 4, 2014, 14 pages.
Final Office Action dated Jan. 21, 2016, issued in connection with U.S. Appl. No. 14/196,774, filed Mar. 4, 2014, 20 pages.
Final Office Action dated Feb. 9, 2017, issued in connection with U.S. Appl. No. 14/196,774, filed Mar. 4, 2014, 22 pages.
Harris, Melissa, "Pandora-like news radio app about to launch," Chicago Tribune website (http://articles.chicagotribune.com/2013-12-01/business/ct-biz-1201-confidential-levy-20131201_1_traffic-report-traffic-information-app), Dec. 1, 2013, 4 pages.
International Searching Authority, International Search Report and Written Opinion dated Mar. 17, 2015, issued in connection with International Patent Application No. PCT/US2014/072829, filed on Dec. 30, 2014, 12 pages.
International Searching Authority, International Search Report and Written Opinion dated Mar. 25, 2015, issued in connection with International Patent Application No. PCT/US2014/072111, filed on Dec. 23, 2014, 12 pages.
International Searching Authority, International Search Report and Written Opinion dated Mar. 31, 2015, issued in connection with International Patent Application No. PCT/US2014/072812, filed on Dec. 30, 2014, 13 pages.
International Searhcing Authority, International Search Report and Written Opinion dated Mar. 18, 2015, issued in connection with International Application No. PCT/US2014/072652, filed on Dec. 30, 2014, 12 pages.
International Searhcing Authority, International Search Report and Written Opinion dated Apr. 22, 2015, issued in connection with International Application No. PCT/US2014/072653, filed on Dec. 30, 2014, 11 pages.
International Searching Authority, International Search Report and Written Opinion dated Mar. 17, 2017, issued in connection with International Patent Application No. PCT/US2016/066961, filed on Dec. 15, 2016, 15 pages.
Non-Final Office Action dated Feb. 1, 2016, issued in connection with U.S. Appl. No. 14/196,870, filed Mar. 4, 2014, 14 pages.
Non-Final Office Action dated Sep. 3, 2015, issued in connection with U.S. Appl. No. 14/196,908, filed Mar. 4, 2014, 41 pages.
Non-Final Office Action dated Oct. 5, 2016, issued in connection with U.S. Appl. No. 14/196,932, filed Mar. 4, 2014, 22 pages.
Non-Final Office Action dated Jul. 16, 2015, issued in connection with U.S. Appl. No. 14/196,932, filed Mar. 4, 2014, 18 pages.
Non-Final Office Action dated Dec. 23, 2016, issued in connection with U.S. Appl. No. 14/281,356, filed May 19, 2014, 18 pages.
Non-Final Office Action dated Jun. 23, 2016, issued in connection with U.S. Appl. No. 14/196,774, filed Mar. 4, 2014, 18 pages.
Non-Final Office Action dated Aug. 25, 2015, issued in connection with U.S. Appl. No. 14/196,774, filed Mar. 4, 2014, 19 pages.
Notice of Allowance dated Aug. 15, 2016, issued in connection with U.S. Appl. No. 14/196,870, filed Mar. 4, 2014, 5 pages.
Notice of Allowance dated Jul. 19, 2016, issued in connection with U.S. Appl. No. 14/196,908, filed Mar. 4, 2014, 11 pages.
Panguluri, Venkatarama Anilkumar, U.S. Appl. No. 14/281,356, filed May 19, 2014, 45 pages.
Printout of website relating to "Rivet News Radio" app, printed Mar. 4, 2014, 2 pages.
Printout of website relating to "Stitcher Radio for Podcasts" app, printed Mar. 4, 2014, 4 pages.
Printout of website relating to "Swell FAQs", printed Mar. 4, 2014, 6 pages.
Printout of website relating to "Swell Radio for News and Podcasts" app, printed Mar. 4, 2014, 3 pages.

(56) References Cited

OTHER PUBLICATIONS

Supplemental Notice of Allowability dated Jul. 27, 2016, issued in connection with U.S. Appl. No. 14/196,908, filed Mar. 4, 2014, 6 pages.
Final Office Action dated Oct. 25, 2017, issued in connection with U.S. Appl. No. 15/223,278, filed Jul. 29, 2016, 33 pages.
Non-Final Office Action dated Oct. 31, 2017, issued in connection with U.S. Appl. No. 15/043,085, filed Dec. 2, 2016, 13 pages.
Australian Government, IP Australia, Examination Repod No. 1 dated Aug. 21, 2017, issued in connection with Australian Application No. 2014385236, 3 pages.
Australian Government, IP Australia, Examination Repod No. 1 dated May 25, 2017, issued in connection with Australian Application No. 2014385186, 2 pages.
Australian Government, IP Australia, Notice of Acceptance for Patent Application dated May 23, 2017, issued in connection with Australian Application No. 2014385233, 3 pages.
Australian Government, IP Australia, Examination Repod No. 1 dated Feb. 17, 2017, issued in connection with Australian Application No. 2014385233, 4 pages.
Canadian Intellectual Property Office, Office Action dated Oct. 23, 2017, issued in connection with Canadian Application No. 2940394, 4 pages.
Corrected Notice of Allowability dated Sep. 20, 2017, issued in connection with U.S. Appl. No. 14/196,932, filed Mar. 4, 2014, 2 pages.
Corrected Notice of Allowability dated Sep. 22, 2017, issued in connection with U.S. Appl. No. 15/244,561, filed Aug. 23, 2016, 2 pages.
European Patent Office, Extended European Search Report dated Nov. 3, 2017, issued in European Application No. 14884480, 10 pages.
European Patent Office, Extended European Search Report dated Oct. 30, 2017, issued in European Application No. 14884638, 9 pages.
Final Office Action dated Jan. 29, 2016, issued in connection with U.S. Appl. No. 14/196,932, filed Mar. 4, 2014, 20 pages.
International Searching Authority, International Search Report and Written Opinion dated Mar. 17, 2017, issued in connection with International Application No. PCT/US2016/06696, filed on Dec. 15, 2016, 15 pages.
Notice of Allowance dated Aug. 31, 2017, issued in connection with U.S. Appl. No. 15/244,561, filed Aug. 23, 2016, 5 pages.
International Bureau of WIPO, International Preliminary Report on Patentability dated Sep. 15, 2016, issued in connection with International Application No. PCT/US2014/072829, 9 pages.
International Bureau of WIPO, International Preliminary Report on Patentability dated Sep. 15, 2016, issued in connection with International Application No. PCT/US2014/072111, 9 pages.
International Bureau of WIPO, International Preliminary Report on Patentability dated Sep. 15, 2016, issued in connection with International Application No. PCT/US2014/072812, 10 pages.
International Bureau of WIPO, International Preliminary Report on Patentability dated Sep. 15, 2016, issued in connection with International Application No. PCT/US2014/072652, 8 pages.
Non-Final Office Action dated Apr. 1, 2020 for U.S. Appl. No. 16/514,555, 22 pages.
Non-Final Office Action dated Apr. 9, 2020 for U.S. Appl. No. 16/447,496, 12 pages.
Non-Final Office Action dated Nov. 30, 2020 for U.S. Appl. No. 16/294,261, 18 pages.
Non-Final Office Action dated Mar. 4, 2021, in connection with U.S. Appl. No. 17/022,603, filed Sep. 16, 2020, 16 pages.
Non-final office action dated Jun. 22, 2021 for U.S. Appl. No. 16/919,289, 13 pages.
GM Voices, Order Voice Files, May 3, 2012, https://web.archive.org/web/20120503032221/https://prompts.gmvoices.com/order.
Non-Final Office Action dated Jan. 24, 2022, in connection with U.S. Appl. No. 16/919,289, filed Jul. 2, 2020, 17 pages.
Non-Final Office Action dated Aug. 3, 2018, issued in connection with for U.S. Appl. No. 15/043,073, filed Feb. 12, 2016, pp. 1-27.
Advisory Action dated Dec. 29, 2017, issued in connection with U.S. Appl. No. 15/223,278, filed Jul. 29, 2016, 3 pages.
Non-Final Office Action dated Jan. 31, 2018, issued in connection with U.S. Appl. No. 15/223,278, filed Jul. 29, 2016, 30 pages.
Non-Final Office Action dated Mar. 14, 2018, issued in connection with U.S. Appl. No. 15/387,345, filed Dec. 21, 2016, 15 pages.
Non-Final Office Action dated May 17, 2017, issued in connection with U.S. Appl. No. 15/223,278, filed Jul. 29, 2016, 32 pages.
Advisory Action dated Apr. 18, 2017, issued in connection with U.S. Appl. No. 14/196,774, filed Mar. 4, 2014, 4 pages.
Canadian Intellectual Property Office, Office Action dated Apr. 20, 2017, issued in connection with Canadian Application No. 2939311, 4 pages.
International Searching Authority, International Search Report and Written Opinion dated Apr. 10, 2017, issued in connection with International Application No. PCT/US2016/066943, filed on Dec. 15, 2016, 12 pages.
Non-Final Office Action dated Apr. 20, 2017, issued in connection with U.S. Appl. No. 15/244,561, filed Aug. 23, 2016, 7 pages.
Notice of Allowance dated May 11, 2017, issued in connection with U.S. Appl. No. 14/196,932, filed Mar. 4, 2014, 7 pages.
Final Office Action dated Nov. 5, 2021, issued in connection with U.S. Appl. No. 16/919,289, filed Jul. 2, 2020, 14 pages.
Non-Final Office Action dated Jan. 24, 2022, issued in connection with U.S. Appl. No. 16/919,289, filed Jul. 2, 2020, 17 pages.

* cited by examiner

AUDIO STREAMING OF TEXT-BASED ARTICLES FROM NEWSFEEDS

CROSS-REFERENCE TO RELATED APPLICATIONS

This application is a continuation of and claims priority to U.S. patent application Ser. No. 17/384,150, filed Jul. 23, 2021, which is hereby incorporated by reference in its entirety.

U.S. patent application Ser. No. 17/384,150 is a continuation of and claims priority to U.S. patent application Ser. No. 16/730,358, filed Dec. 30, 2019, which is hereby incorporated by reference in its entirety.

U.S. patent application Ser. No. 16/730,358 is a continuation of and claims priority to U.S. patent application Ser. No. 15/387,327, filed Dec. 21, 2016, which is hereby incorporated by reference in its entirety.

BACKGROUND

Newsfeeds are accessible by packet-switched networks (e.g., the Internet) in various forms. For example, really simple syndication (RSS, sometimes known as rich site summary) is a widespread type of newsfeed that is formatted and accessed by client devices in a standardized fashion. Other types of standard and proprietary newsfeeds may also exist. Regardless, these newsfeeds primarily provide text-based articles to the client devices. While doing so is suitable when the client devices are operating text-based newsreaders, such text-based articles are not suitable for users who are visually-impaired, or who are occupied with other tasks that require their visual attention, such as driving, jogging, walking, or doing housework.

SUMMARY

The embodiments herein disclose various mechanisms for streaming audio versions of text-based articles to client devices. In some aspects, a user may select one or more newsfeeds due to the user's general or specific interest in their content. Each of these newsfeeds may provide one or more text-based articles at a time, and the newsfeeds may be updated periodically. For instance, when an online publication (e.g., a newspaper, magazine, blog, etc.) publishes a new text-based article, one or more of its newsfeeds may be updated to include this article. A newsfeed may contain copies of or references to some or all published text-based articles.

Once selected, a newsfeed may be added to a list accessible to a newsreader application of the user's client device. The newsreader application may periodically check with web servers associated with the newsfeeds to obtain updates. The newsreader application may also display text-based articles from the selected newsfeeds in a fashion that is easy for the user to browse. For instance, the newsreader application may display a list of recently-published articles from various feeds, and allow the user to select one or more of the articles for display. In some cases, the newsreader application may only display a brief summary of a text-based article (e.g., the first paragraph or the first n characters of the article), and the user may click through this summary to be directed to a copy of the article at a web site of the article's publisher.

Regardless, visually impaired users, as well as users who are visually occupied, might not be able to enjoy the benefits of text-based articles from newsfeeds. Consequently, the embodiments herein allow users to tag one or more text-based articles or newsfeeds for conversion to audio files. This conversion may take place by way of an automated text-to-speech (TTS) system, by way of verbal reading, or a combination of both. Once the audio files are available, they may be streamed to the user's client device for audible playout. In this fashion, a user can conveniently listen to the audio files without having to be visually engaged with a newsreader application. Thus, for instance, the user can listen to selected text-based articles while driving.

Accordingly, a first example embodiment may involve, receiving, by a server device and from a client device, a selection of text-based articles from newsfeeds. The selection may specify that the text-based articles have been flagged for audible playout. The first example embodiment may also involve, possibly in response to receiving the selection of the text-based articles, retrieving, by the server device, the text-based articles from the newsfeeds. The first example embodiment may also involve causing, by the server device, the text-based articles to be converted into audio files. The first example embodiment may also involve receiving, by the server device, a request to stream the audio files to the client device. The first example embodiment may also involve causing, by the server device, the audio files to be streamed to the client device.

In a second example embodiment, an article of manufacture may include a non-transitory computer-readable medium, having stored thereon program instructions that, upon execution by a computing device, cause the computing device to perform operations in accordance with the first example embodiment.

In a third example embodiment, a computing device may include at least one processor, as well as memory and program instructions. The program instructions may be stored in the memory, and upon execution by the at least one processor, cause the computing device to perform operations in accordance with the first example embodiment.

In a fourth example embodiment, a system may include various components for carrying out each of the operations of the first example embodiment (e.g., via some combination of software-implemented and/or hardware-implemented functional units).

Although examples described herein attribute certain acts to certain devices, any device or devices could perform those acts. For instance, some or all of the acts attributed to a "server device" above could be performed by different server devices and/or a client device.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
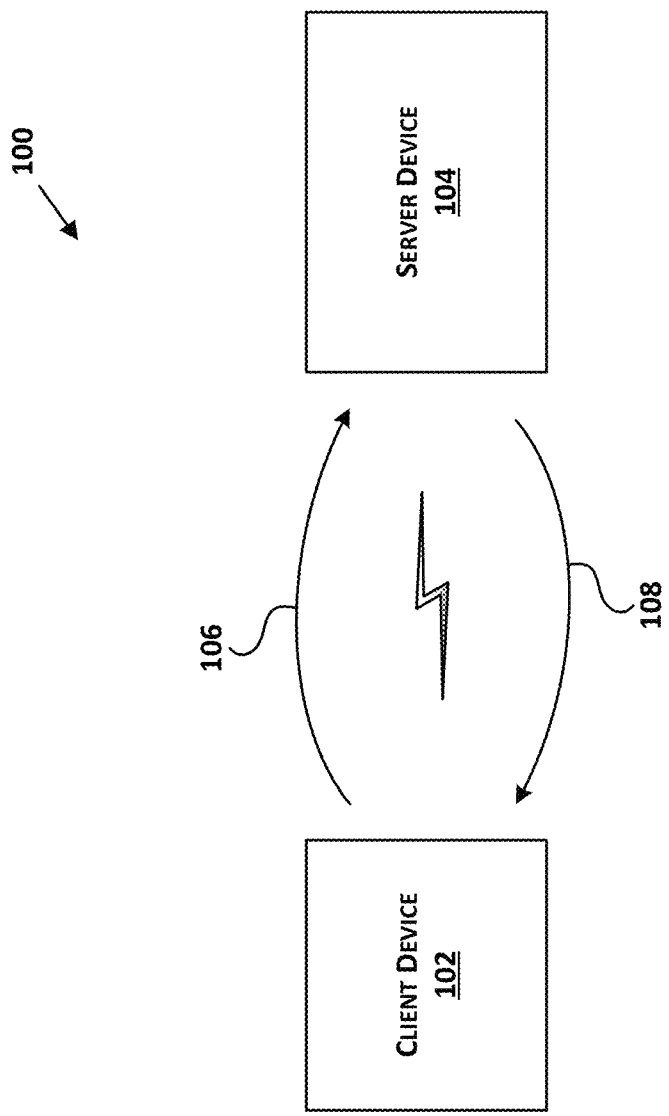
FIG. 1 is a high-level depiction of a client-server computing system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations. For instance, steps, blocks, or acts assigned to a particular device (e.g., a server device) may be carried out by components of another device (e.g., a client device) in alternative embodiments.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

1. Overview

As noted above, the embodiments herein provide for user selection of newsfeeds and/or text-based articles from newsfeeds, conversion of these text-based articles to audio files, and streaming of the audio files to client devices associated with the users. These embodiments require computer implementation and are non-analogous to pre-Internet audio distribution techniques.

Notably, unlike traditional broadcast audio, online (e.g., Internet-based) audio may be based on a playlist, and this playlist can be personalized for an individual user and/or client device. For instance, a server device may generate a playlist based on selected text-based articles or newsfeeds. This playlist may contain a sequence of references (e.g., uniform resource locators, or URLs) to one or more remote audio files. Such a playlist may be transmitted to the client device. The client device may traverse the playlist, retrieving and playing out the audio files. In doing so, the client device may either download one or more of the audio files (from the server device or a different device) prior to playing them out, or may receive the audio files as a stream.

Herein, a download of an audio file may refer to a client device obtaining the entire audio file from a server device before beginning to play out any part of the audio file. The streaming of an audio file, on the other hand, may involve the client device receiving one portion of the audio file while simultaneously playing out another, previously-received, portion of the audio file. While the embodiments herein are generally directed to streaming of audio files, they may be used for the download and subsequent playout of audio files as well.

As an example of streaming, the server device may transmit the playlist to the client device, and the client device may traverse the entries of the playlist. In doing so, the client device may retrieve data representing each referenced audio file, and play out the audio files in accordance with the sequence defined by the playlist. Thus, for each reference in the sequence defined by the playlist, (i) the client device may transmit, to the server device (or a different device), a request for the referenced audio file, (ii) the server device may receive the transmitted request, (iii) responsive to the server device receiving the transmitted request, the server device may transmit to the client, a stream of the requested audio file, (iv) the client device may begin receiving and buffering the stream of the audio file, and (v) while still receiving the stream of the audio file, the client device may play out the received portion of the audio file. In this way, a user may be provided with a substantially continuous playout of the audio files referenced by the playlist.

As a result of the personalization and streaming, the embodiments herein require computers and computer networks. Traditional broadcasting and newscasting systems were unable to support individual user selection of content, and operated using different technology. For instance, these traditional systems generally involve over-the-air analog broadcasting in strict real time. The embodiments herein involve transmission of a digital stream over a packet-switched network (such as the Internet) to client devices. The client devices can accommodate for jitter (delay variance) in the delivery of stream through the use of buffering.

In any event, streaming of audio files is a particularly advantageous way of providing, to users who are visually impaired, information that is originally in the form of text-based articles. Rather than relying on TTS translation built into a client device or newsreader application, which may vary in quality and capabilities, server-based TTS can produce audio files of a consistently high quality due to the greater computing power of server devices. Further, this greater power can be used to produce TTS audio files that are customized to a user's preferences in terms of voice gender, accent, speaking style, and so on. Also, the user's client device may be battery-powered (e.g., a cell phone or tablet), and performing the conversion on server devices removes a compute-intensive task from the client devices, thereby reducing their power consumption.

Streaming of audio files is also advantageous to users who have times in which they operate their devices in a handsfree mode. For example, if a user spends one hour driving to and from work most days, the user may wish to listen to selected text-based articles or newsfeeds during this time when reading such material is ill-advised if not impossible.

The embodiments herein facilitate such activities by allowing users to select one or more text-based articles from newsfeeds, converting the selected articles into audio files, then streaming these audio files to the user's client device at a later point in time.

Regardless of how they may be implemented, the embodiments herein may make use of one or more computing devices. These computing devices may include, for example, client devices under the control of users, and server devices that directly or indirectly interact with the client devices. Such devices are described in the following section.

2. Example Computing Devices, Computing Environments, and Playout Arrangements FIG. 1 illustrates an example communication system 100 for carrying out one or more of the embodiments described herein. Communication system 100 may include computing devices. Herein, a "computing device" may refer to either a client device, a server device (e.g., a stand-alone server computer or networked cluster of server equipment), or some other type of computational platform.

Client device 102 may be any type of device including a personal computer, laptop computer, a wearable computing device, a wireless computing device, a head-mountable computing device, a mobile telephone, or tablet computing device, etc., that is configured to transmit data 106 to and/or receive data 108 from a server device 104 in accordance with the embodiments described herein. For example, in FIG. 1, client device 102 may communicate with server device 104 via one or more wireline or wireless interfaces. In some cases, client device 102 and server device 104 may communicate with one another via a local-area network. Alternatively, client device 102 and server device 104 may each reside within a different network, and may communicate via a wide-area network, such as the Internet.

Client device 102 may include a user interface, a communication interface, a main processor, and data storage (e.g., memory). The data storage may contain instructions executable by the main processor for carrying out one or more operations, such as operations relating to the data sent to, or received from, server device 104, and/or other operations disclosed herein. The user interface of client device 102 may include buttons, a touchscreen, a microphone, and/or any other elements for receiving inputs, as well as a speaker, one or more displays, and/or any other elements for communicating outputs.

Server device 104 may be any entity or computing device arranged to carry out the server operations described herein. Further, server device 104 may be configured to send data 108 to and/or receive data 106 from the client device 102.

Data 106 and data 108 may take various forms. For example, data 106 and 108 may represent packets transmitted by client device 102 or server device 104, respectively, as part of one or more communication sessions. Such a communication session may include packets transmitted on a signaling plane (e.g., session setup, management, and teardown messages), and/or packets transmitted on a media plane (e.g., text, graphics, audio, and/or video data). For instance, data 106 may include transmissions of requests for playlists and audio file streams, while data 108 may include, in response to these requests, transmissions of playlists and audio file streams, respectively.

Regardless of the exact architecture, the operations of client device 102, server device 104, as well as any other operation associated with the architecture of FIG. 1, can be carried out by one or more computing devices. These computing devices may be organized in a standalone fashion, in cloud-based (networked) computing environments, or in other arrangements.

Figure 2:
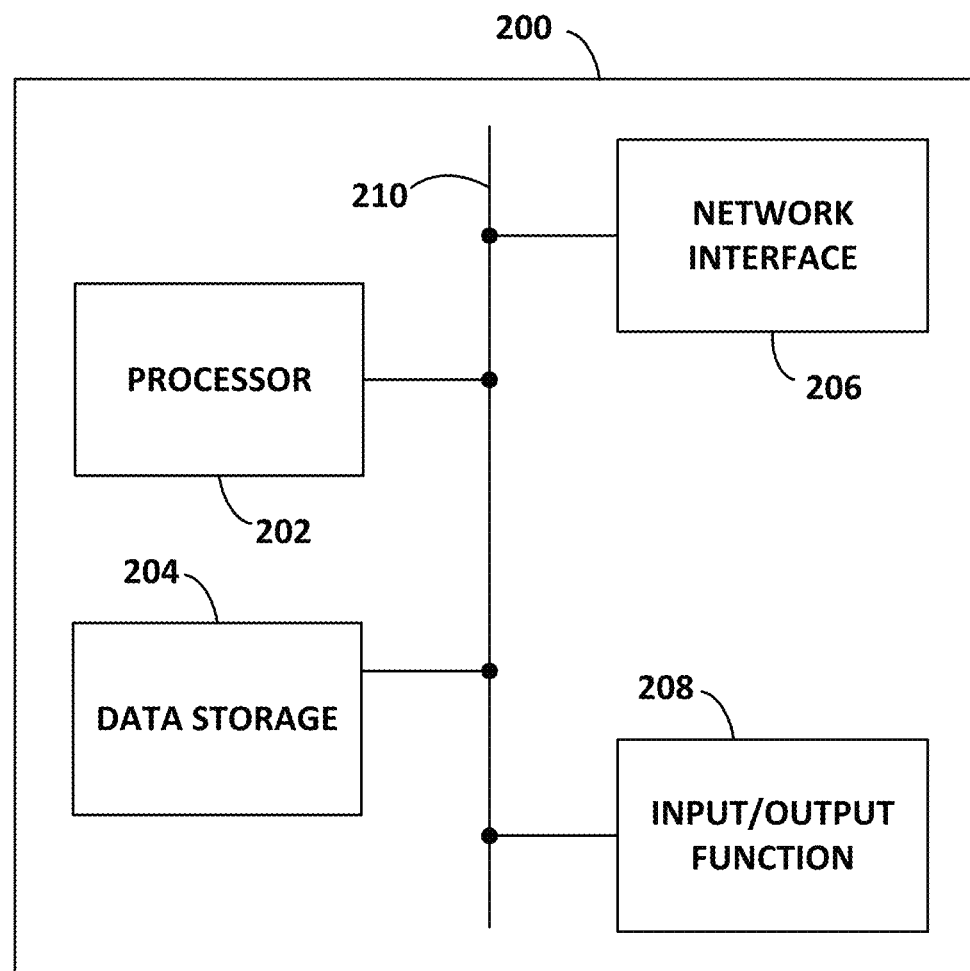
FIG. 2 illustrates a schematic drawing of a computing device, according to an example embodiment.

FIG. 2 is a simplified block diagram exemplifying a computing device 200, illustrating some of the functional components that could be included in a computing device arranged to operate in accordance with the embodiments herein. Example computing device 200 could be a client device, a server device, or some other type of computational platform. For purposes of simplicity, this specification may equate computing device 200 to a server from time to time. Nonetheless, the description of computing device 200 could apply to any component used for the purposes described herein.

In this example, computing device 200 includes a processor 202, a data storage 204, a network interface 206, and an input/output function 208, all of which may be coupled by a system bus 210 or a similar mechanism. Processor 202 can include one or more CPUs, such as one or more general purpose processors and/or one or more dedicated processors (e.g., application specific integrated circuits (ASICs), digital signal processors (DSPs), network processors, etc.).

Data storage 204, in turn, may comprise volatile and/or non-volatile data storage and can be integrated in whole or in part with processor 202. Data storage 204 can hold program instructions, executable by processor 202, and data that may be manipulated by these instructions to carry out the various methods, processes, or operations described herein. Alternatively, these methods, processes, or operations can be defined by hardware, firmware, and/or any combination of hardware, firmware and software.

By way of example, the data in data storage 204 may contain program instructions, perhaps stored on a non-transitory, computer-readable medium, executable by processor 202 to carry out any of the methods, processes, or operations disclosed in this specification or the accompanying drawings. Data storage 204 may also contain one or more playlists and/or audio files possibly referred to by playlists.

Network interface 206 may take the form of a wireline connection, such as an Ethernet, Token Ring, or T-carrier connection. Network interface 206 may also take the form of a wireless connection, such as IEEE 802.11 (Wifi), BLUETOOTH®, or a wide-area wireless connection. However, other forms of physical layer connections and other types of standard or proprietary communication protocols may be used over network interface 206. Furthermore, network interface 206 may comprise multiple physical interfaces.

Input/output function 208 may facilitate user interaction with example computing device 200. Input/output function 208 may comprise multiple types of input devices, such as a keyboard, a mouse, a touch screen, and so on. Similarly, input/output function 208 may comprise multiple types of output devices, such as a screen, monitor, printer, or one or more light emitting diodes (LEDs). Additionally or alternatively, example computing device 200 may support remote access from another device, via network interface 206 or via another interface (not shown), such as a universal serial bus (USB) or high-definition multimedia interface (HDMI) port.

In some embodiments, one or more computing devices may be deployed in a networked architecture. The exact physical location, connectivity, and configuration of the computing devices may be unknown and/or unimportant to client devices. Accordingly, the computing devices may be referred to as "cloud-based" devices that may be housed at various remote locations.

Figure 3:
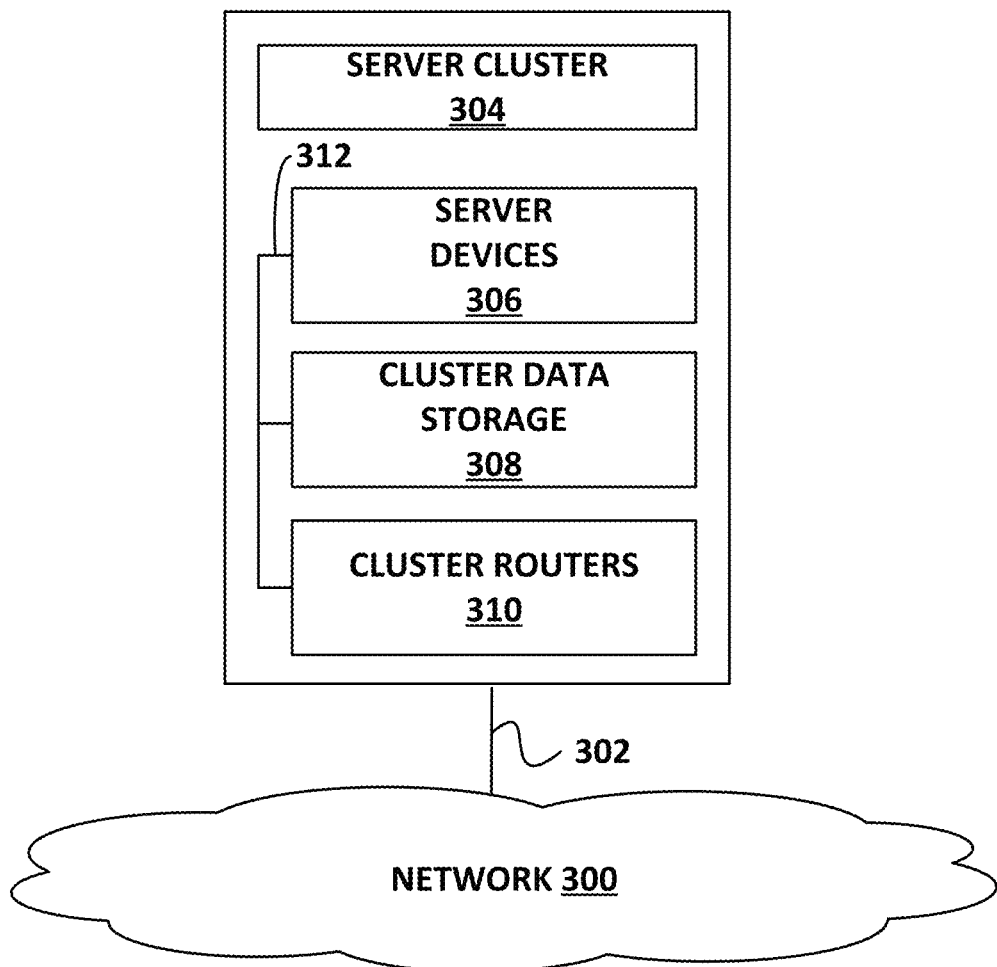
FIG. 3 illustrates a schematic drawing of a networked server cluster, according to an example embodiment.

FIG. 3 depicts a cloud-based server cluster 304 in accordance with an example embodiment. In FIG. 3, functions of a server device, such as server device 104 (as exemplified by computing device 200) may be distributed between server devices 306, cluster data storage 308, and cluster routers 310, all of which may be connected by local cluster network 312. The number of server devices, cluster data storages, and cluster routers in server cluster 304 may depend on the computing task(s) and/or applications assigned to server cluster 304.

For example, server devices 306 can be configured to perform various computing tasks of computing device 200. Thus, computing tasks can be distributed among one or more of server devices 306. To the extent that these computing tasks can be performed in parallel, such a distribution of tasks may reduce the total time to complete these tasks and return a result. For purposes of simplicity, both server cluster 304 and individual server devices 306 may be referred to as "a server device." This nomenclature should be understood to imply that one or more distinct server devices, data storage devices, and cluster routers may be involved in server device operations.

Cluster data storage 308 may be data storage arrays that include disk array controllers configured to manage read and write access to groups of disk drives (e.g., hard drives with rotating platters or solid state drives). The disk array controllers, alone or in conjunction with server devices 306, may also be configured to manage backup or redundant copies of the data stored in cluster data storage 308 to protect against disk drive failures or other types of failures that prevent one or more of server devices 306 from accessing units of cluster data storage 308. As an example, cluster data storage 308 may contain one or more playlists and/or audio files possibly referred to by playlists.

Cluster routers 310 may include networking equipment configured to provide internal and external communications for the server clusters. For example, cluster routers 310 may include one or more packet-switching and/or routing devices configured to provide (i) network communications between server devices 306 and cluster data storage 308 via cluster network 312, and/or (ii) network communications between the server cluster 304 and other devices via communication link 302 to network 300.

Additionally, the configuration of cluster routers 310 can be based at least in part on the data communication requirements of server devices 306 and cluster data storage 308, the latency and throughput of the local cluster networks 312, the latency, throughput, and cost of communication link 302, and/or other factors that may contribute to the cost, speed, fault-tolerance, resiliency, efficiency and/or other design goals of the system architecture.

As a possible example, cluster data storage 308 may include any form of database, such as a structured query language (SQL) database. Various types of data structures may store the information in such a database, including but not limited to tables, arrays, lists, trees, and tuples. Furthermore, any databases in cluster data storage 308 may be monolithic or distributed across multiple physical devices.

Server devices 306 may be configured to transmit data to and receive data from cluster data storage 308. This transmission and retrieval may take the form of SQL queries or other types of database queries, and the output of such queries, respectively. Additional text, images, video, and/or audio may be included as well. Furthermore, server devices 306 may organize the received data into web page representations. Such a representation may take the form of a markup language, such as the hypertext markup language (HTML), the extensible markup language (XML), or some other standardized or proprietary format. Moreover, server devices 306 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

Figure 4A:
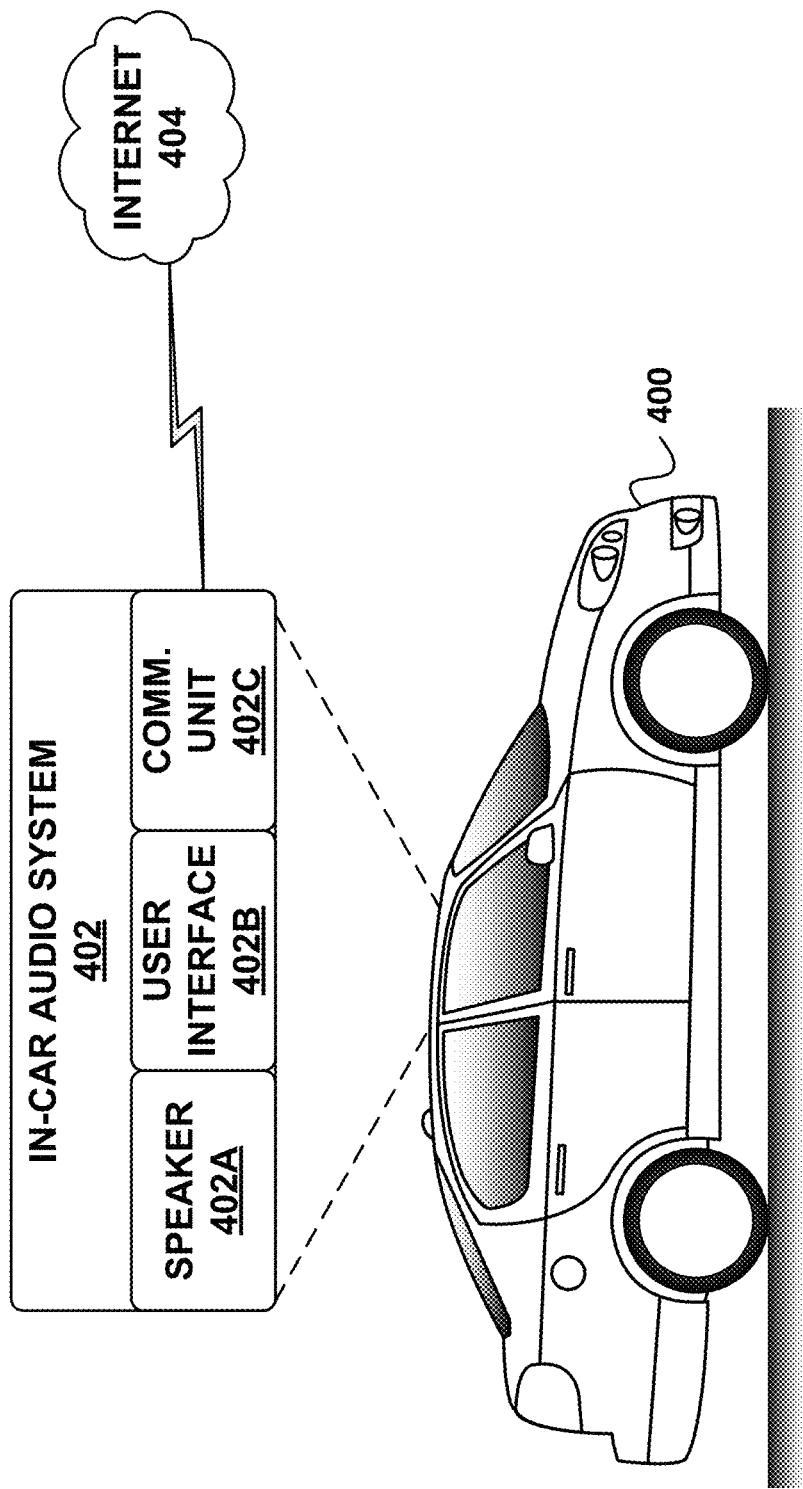
FIG. 4A depicts components of an in-car audio system, according to an example embodiment.
Figure 4B:
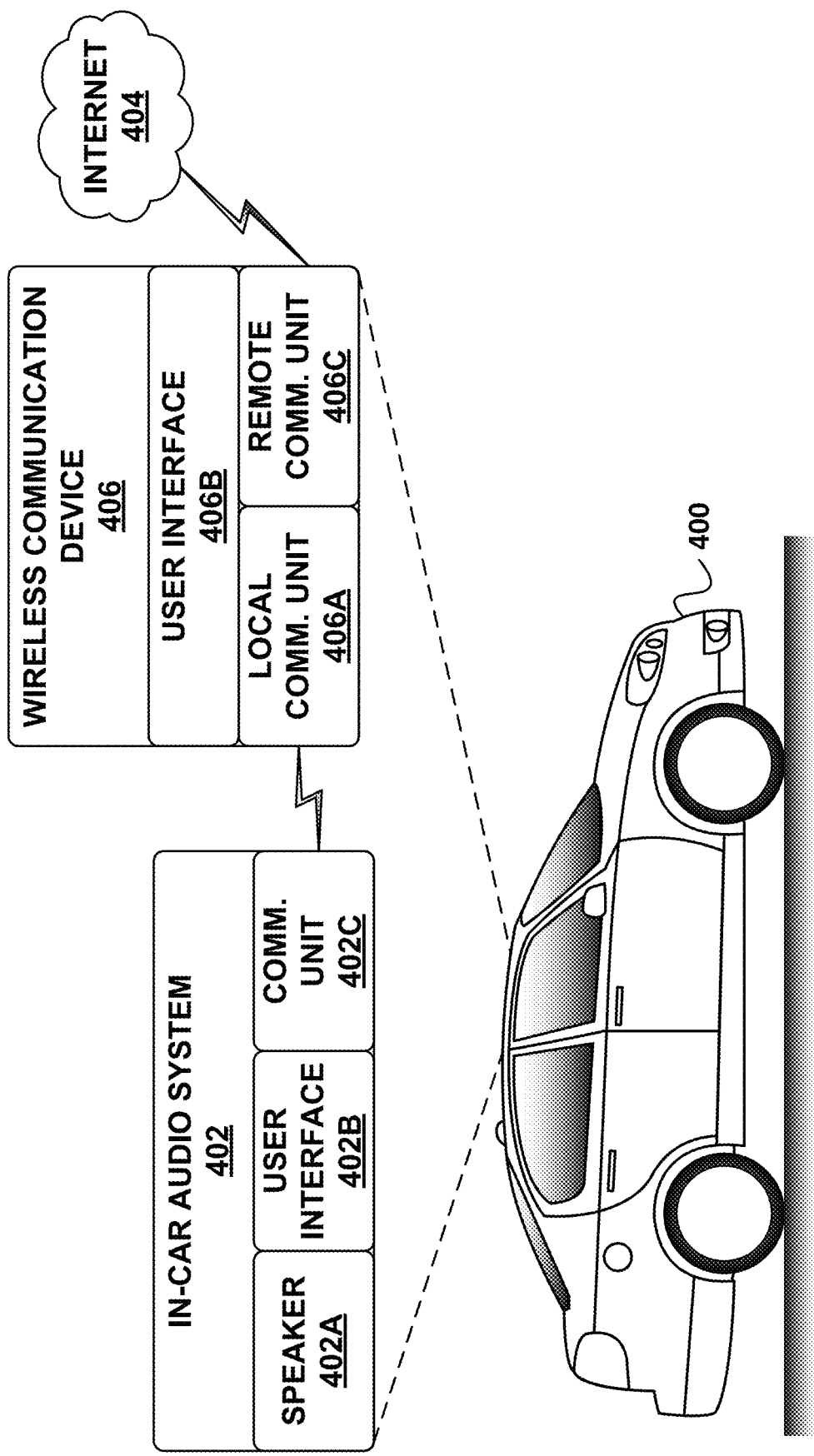
FIG. 4B depicts components of an in-car audio system interacting with a wireless communication device, according to an example embodiment.

Some of the embodiments herein may involve playout of audio files (streamed or downloaded) by way of an in-car audio system. FIGS. 4A and 4B depict examples of such an arrangement.

FIG. 4A includes car 400 equipped with in-car audio system 402. The latter contains one or more instances of a speaker 402A, a user interface 402B, and a communication unit 402C. In-car audio system 402 may include additional components not depicted in FIG. 4A, such as processors, memory, decoders, and so on.

Speaker 402A may include any mechanism for converting digital signals into audio output. User interface 402B may include, for instance, a touchscreen through which in-car audio system 402 can be controlled. Communication unit 402C may include one or more wireless communication interfaces through which in-car audio system 402 can communicate with a packet-switched network, of which Internet 404 is an example.

In the embodiment of FIG. 4A, in-car audio system 402 may request and receive, by way of communication unit 402C, streams or downloads of audio files from Internet 404. In-car audio system 402 may play out these audio files through speaker 402A. User interface 402B may be used to set up, modify, or terminate such a configuration.

FIG. 4B also includes car 400 equipped with in-car audio system 402. But, in this depiction, communication unit 402C of in-car audio system 402 communicates with local communication unit 406A of wireless communication device 406. Remote communication unit 406C of wireless communication device 406, in turn, communicates with Internet 404. Wireless communication device 406 may be, for example, a cell phone, tablet, or another type of network-enabled portable computer.

The link between communication unit 402C and local communication unit 406A may be either wired or wireless. For instance, this link may be a USB cable connecting communication unit 402C and local communication unit 406A or a BLUETOOTH® association between these units.

In some embodiments, in-car audio system 402 may be configured (perhaps by way of user interface 402B) to play out audio provided to it by wireless communication device 406. Wireless communication device 406 may be configured (perhaps by way of user interface 406B) to download or stream audio files by way of Internet 404. Thus, streaming audio may be transmitted by a server device accessible via Internet 404, received by wireless communication device 406, and relayed or retransmitted to in-car audio system 402.

In some cases, the audio files may stream between such a server device and wireless communication device 406, with wireless communication device providing digital audio output to in-car audio system 402. In other cases, wireless communication device 406 may download one or more audio files from the server device, then stream these files to in-car audio system 402 for playout. Other arrangements may exist.

3. Example Newsfeed Format and Newsfeed Conversion

As noted above, newsfeeds can be delivered to client devices in various ways. The following provides an example XML, file containing an RSS newsfeed. The newsfeed contains at least a portion of one or more text-based articles.

A server device may transmit such an XML file to a client device. The client device, by way of an application operating on the client device, may process the XML file, represent the information therein on a user interface, and allow a user to select one or more articles for conversion to audio. The application may allow the user to access or subscribe to multiple newsfeeds so that the user can ultimately select text-based articles from one or more newsfeeds.

Nonetheless, the newsfeed format shown below is just one example. Other newsfeed formats (e.g., NewsML or Atom) may be used instead of or in addition to RSS. For sake of convenience, line numbers have been added to this example. In actual RSS newsfeeds, the line numbers would not appear.

```
1    <?xml version="1.0" encoding="UTF-8" ?>
2    <rss version="2.0">
3    <channel>
4       <title>Title</title>
5       <description>Example Newsfeed</description>
6       <link>http://www.example.com/blog/feed.html</link>
7       <lastBuildDate> Thu, 20 Oct 2016 08:22:37
         +0000</lastBuildDate>
8       <ttl>180</ttl>
9       <item>
10        <title>First Entry</title>
11        <description>Description of first entry.</description>
12        <link>http://www.example.com/blog/1.html</link>
13        <pubDate>Thu, 20 Oct 2016 08:22:37 +0000</pubDate>
14      </item>
15      <item>
16        <title>Second Entry</title>
17        <description>Description of second entry.</description>
18        <link>http://www.example.com/blog/2.html</link>
19        <pubDate>Wed, 19 Oct 2016 06:57:12 +0000</pubDate>
20      </item>
21   </channel>
22   </rss>
```

Line 1 of the example RSS newsfeed specifies header components that indicate that the newsfeed is in an XML file with UTF-8 encoding. Line 2 specifies that the XML file is formatted according to RSS version 2.0. Line 2 also specifies the beginning of the RSS newsfeed specification.

Lines 3-21 define an RSS channel. There is usually one channel per RSS file, and such a channel specifies a single newsfeed.

Lines 4-8 describe the channel/newsfeed. In this example, the newsfeed's name is "Example Newsfeed" as provided in the <description> element, and a URL of the newsfeed is provided in the <link> element. The <lastBuildDate> element provides the most recent time at which the content of the newsfeed changed. The <ttl> element indicates that a client device should request an update of the newsfeed (e.g., request a new copy of the newsfeed) every 180 minutes. In this way, the client device may be able to obtain changes to the newsfeed, such as the publication of new articles.

Lines 9-14 describe the first text-based article in the newsfeed. In some embodiments, text-based articles in a newsfeed may be arranged in reverse chronological order, but other ordering possibilities exist. The <title> element of line 10 provides the title of the first text-based article. The <description> element of line 11 provides at least a portion of the body of the first text-based article. In some cases, such a description may be several sentences, a paragraph, or arbitrarily long. The <link> element of line 12 provides a URL of the first text-based article. The <pubDate> element of line 13 provides the date and time at which the first text-based article was published.

Similar to lines 9-14, lines 15-20 describe the second text-based article in the newsfeed. The <title> of line 16 provides the title of the second text-based article. The <description> element of line 17 provides at least a portion of the body of the second text-based article. The <link> element of line 18 provides a URL of the second text-based article. The <pubDate> element of line 19 provides the date and time at which the second text-based article was published.

In some embodiments, the URLs of selected text-based articles (or the articles themselves) may be provided by the user's client device to an automated TTS system for conversion to audio files. TTS systems may convert the text in the text-based articles to computer-generated speech. As an example, for each URL or text-based article received, the TTS system may produce an associated audio file. These audio files may be stored on a TTS system server, in audio database(s), or at some other location for eventual streaming to the user's client device. In some cases, these audio files may be downloaded to the user's client device.

Selection of a TTS system, or parameters for a TTS system's operation, may depend on a profile associated with the user's client device. The profile may specify a gender, language, accent, speaking rate, and so on for the TTS conversion. For instance, the profile may indicate that a text-based article that is in English should be converted to spoken English with a male Northeastern United States accent at a particular speaking rate, or to a female Australian accent at a different speaking rate.

In other embodiments, the user may subscribe to a premium service that provides a verbal reading of the selected text-based articles. For instance, the premium service may have access to a number of recording studios, each with associated human announcers. These recording studio and/ or news announcers may also depend on the profile associated with the user's client device. For instance, the profile may indicate the user's preference of announcer gender, language, accent, speaking rate, style (e.g., calm, moderate, or hyperbolic), and so on. In some embodiments, a combination of computer-generated and verbally spoken audio files may be used.

Once audio files containing spoken versions of the text-based articles are produced, these files may be stored on a server of the recording studio, audio database(s), or at some other location for eventual streaming to the user's client device. In some cases, these audio files may be downloaded to the user's client device.

4. Example Playlist and Streaming Environment

Once audio files are available, the user's client device may be provided with a playlist of these audio files. With such a playlist, the client device may be able to request streams of the audio files and play out these streams.

Figure 5A:
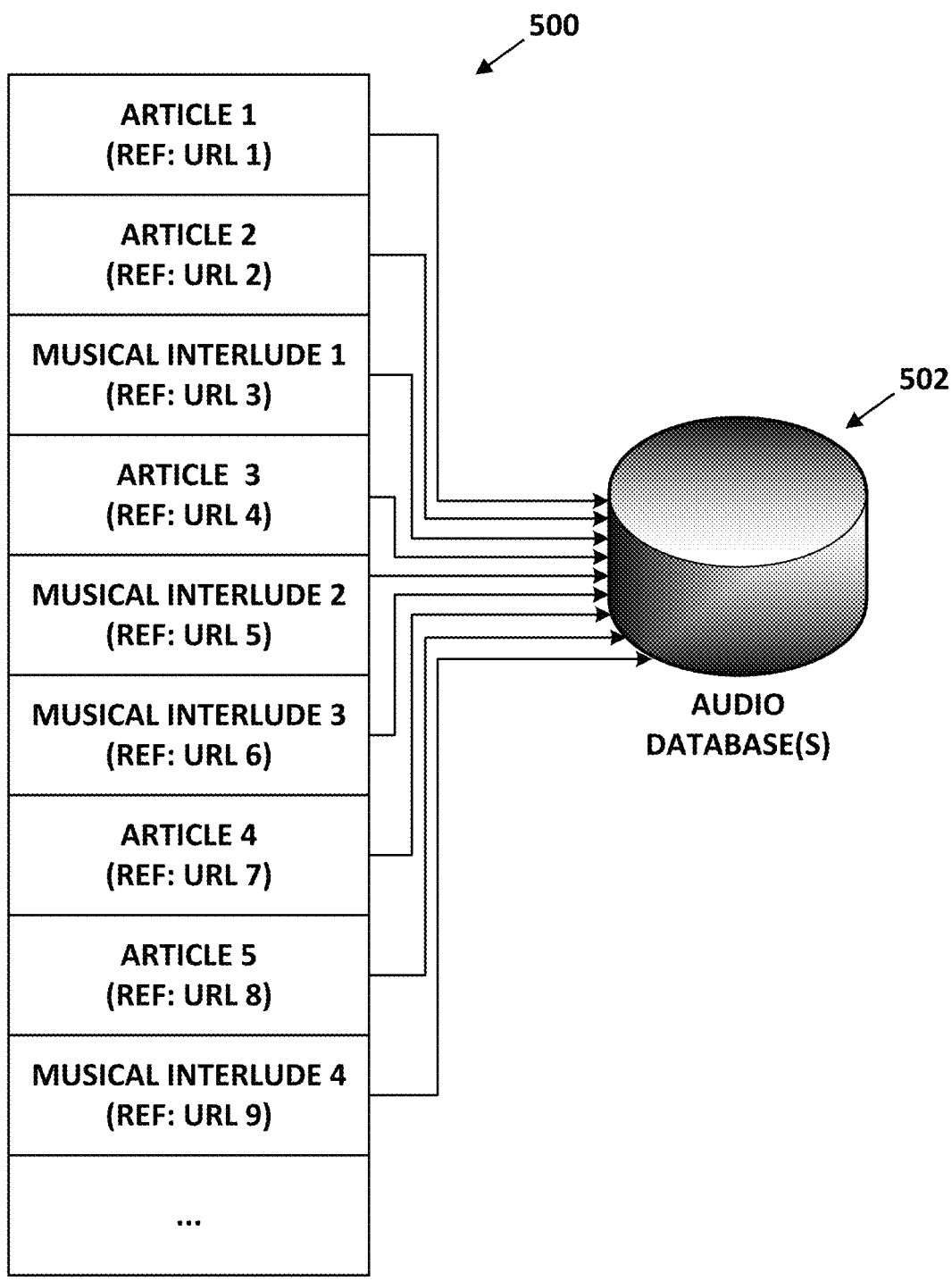
FIG. 5A depicts a playlist, according to an example embodiment.

FIG. 5A depicts an example playlist 500, which contains a sequence of references to audio files. Playlist 500 may take the form of a computer file, such as a plain text file, an XML file, an HTML file, a binary file, or some other file format. Playlists may take other forms as well, and may contain other types of content.

Playlist 500 may be generated by a server device, such as server device 104, for a specific client device, such as client device 102. Each entry in playlist 500 may include an identifier of an audio file and/or a reference to the audio file. Audio files referred to in playlist 500 may be stored in audio database(s) 502. Thus, for example, the referenced article 1 in playlist 500 contains a URL that points to the location of the audio file for article 1, while the referenced musical interlude 1 in playlist 500 contains a URL that points to the location of the audio file for musical interlude 1, and so on. Nonetheless, playlists may take other forms, including generic sequences of files or references to files.

In general, audio database(s) 502 may contains hundreds, thousands, tens of thousands, or even more audio files. Thus, audio database(s) 502 may represent one or more physical devices that store these files. Such physical devices may be located in the same physical location, or may be distributed over a communication network (e.g., the Internet). In some cases, the audio files may be obtained via a third-party file download or streaming service.

Playlist 500 contains references to five articles that are roughly interleaved with references to four musical interludes. A playlist may contain more or fewer entries, however. Additionally, the patterns of articles and musical interludes may vary. In some cases, a playlist may predominately contain references to articles with few references to musical interludes, and in other cases a playlist may predominately contain references to musical interludes with few references to articles. The musical interludes may exist as audio files that are separate from the audio files derived from the text-based articles.

In some embodiments, a playlist need not be used. For example, the client device might sequentially request and receive streaming of one or more audio files based on input from a user.

Figure 5B:
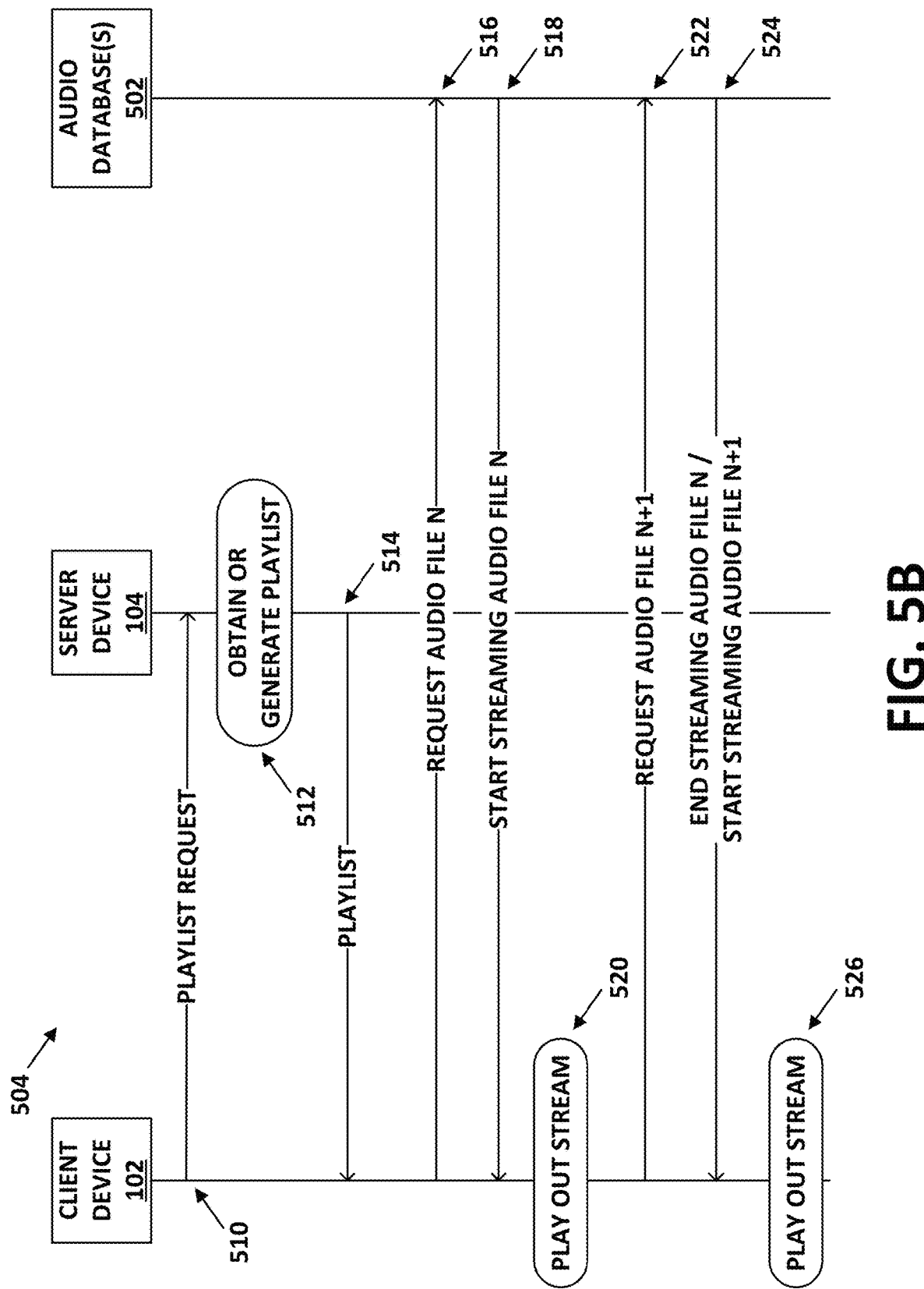
FIG. 5B is a message flow diagram depicting distribution of a playlist, as well as distribution and playout of audio files referenced by the playlist, according to an example embodiment.

FIG. 5B is a message flow diagram 504 depicting an example distribution of a playlist. Message flow diagram 504 includes client device 102, server device 104, and audio database(s) 502. In some embodiments, one or more of server device 104 and audio database(s) 502 may be combined into fewer components or divided into more components. For instance, server device 104 may contain the functionality of audio database(s) 502. Other arrangements are possible.

Client device 102 may include an audio player application that can request playlists, load playlists, parse playlists, and/or request streams of audio files referenced in playlists. In some embodiments, the audio player application may be triggered to begin requesting and streaming the audio files by reception of a playlist.

At step 510, client device 102 may transmit a playlist request to server device 104. Here, it is assumed that server device 104, or some other device, has generated a playlist based on one or more audio files to be streamed to client device 102, or has the ability to generate or otherwise obtain the playlist if the playlist is not otherwise available. Thus, at step 512, server device 104 may generate or obtain the playlist. At step 514, server device 104 may transmit a representation of the playlist to client device 102. As was discussed in the context of FIG. 5A, the playlist may include a sequence of references to audio files stored in audio database(s) 502.

At step 516, client device 102 may transmit, to audio database(s) 502, a request for the nth entry of the playlist. For instance, client device 102 may parse the playlist, determine the URL of the nth entry, and request the content at that URL from audio database(s) 502. In response, at step 518, audio database(s) 502 may start transmitting, to client device 102, a stream of the audio file associated with this entry. Then, at step 520, client device 102 may play out the stream.

Notably, client device 102 may receive and buffer a portion of the stream (e.g., 5-10 seconds) before beginning playout of the stream. In this way, if there is jitter in the delivery of subsequent portions of the stream to client device 102, this jitter may be hidden from the user by the buffering of the stream. Client device 102 may seek to maintain such buffering through playout of all audio files.

At step 522, client device 102 may transmit, to audio database(s) 502, a request for the (n+1)th entry of the playlist. Client device 102 may transmit this request while still playing out a portion of the audio file associated with the nth entry. In this manner, client device 102 may be able to transition smoothly from playout of the audio file associated with the nth entry to playout of the audio file associated with the (n+1)th entry. For instance, the audio player application may fade out the end of the audio file associated with the nth entry while fading in the beginning of the audio file associated with the (n+1)th entry.

Regardless, at step 524, audio database(s) 502 may start transmitting, to client device 102, a stream of the audio file associated with the (n+1)th entry. The beginning of this stream may coincide with (e.g., directly follow) the end of the streaming of the audio file associated with the nth entry. Or, the streaming of these two audio files may overlap to some extent. Then, at step 526, client device 102 may play out the stream.

FIGS. 5A and 5B are just example embodiments of playlist generation and audio file streaming. Other embodiments may be used to achieve the same or similar outcomes.

5. Example Operations

Figure 6A:
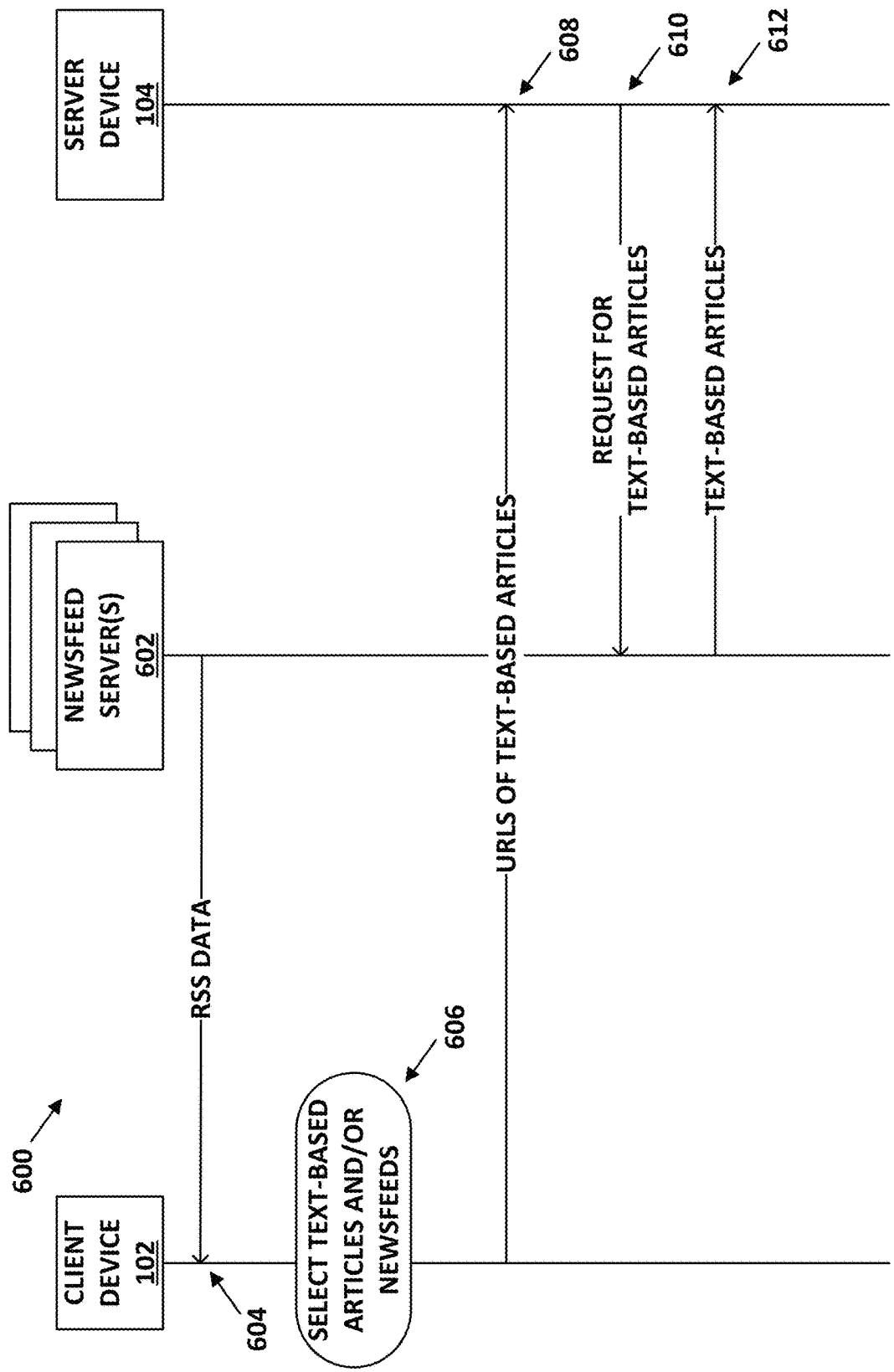
FIG. 6A is a message flow diagram depicting selection of text-based articles, according to an example embodiment.
Figure 6B:
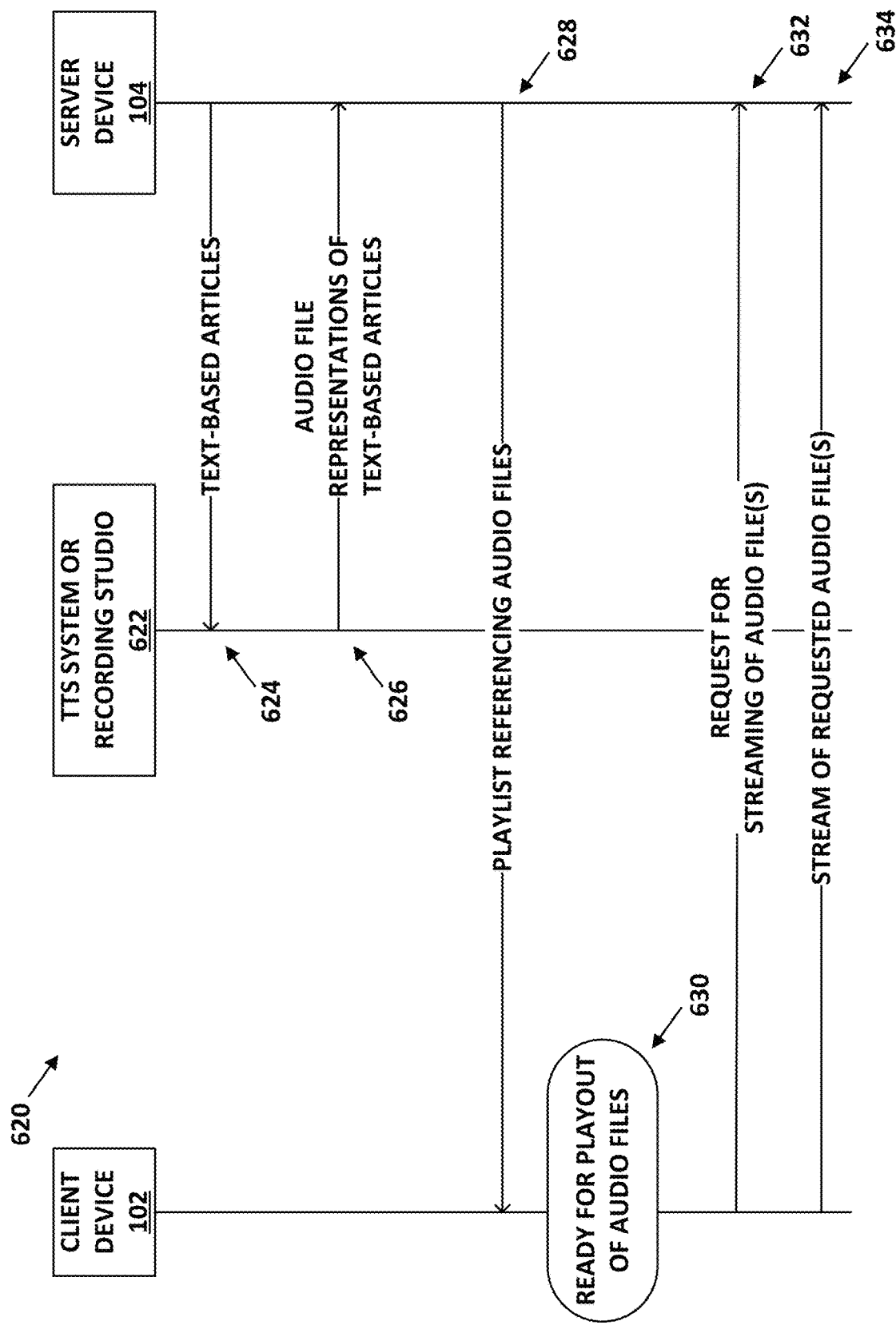
FIG. 6B is a message flow diagram depicting conversion of selected text-based articles to audio files and streaming of the audio files, according to an example embodiment.

FIGS. 6A and 6B depict message flow diagrams in accordance with example embodiments. Message flow diagram 600 of FIG. 6A depicts selection of text-based articles, and involves client device 102, server device 104, and one or more newsfeed servers 602.

At step 604, client device 102 receives RSS data from newsfeed server(s) 602. Client device 102 may have previously requested this data. Further, in some embodiments, newsfeeds of a format other than RSS may be used.

At step 606, one or more text-based articles or newsfeeds may be selected. As an example, an application executing on client device 102 may provide a menu on a user interface that allows a user of client device 102 to select the text-based articles or newsfeeds. The menu may display the titles of the text-based articles and/or the newsfeeds so that the user can make an informed selection. Selection of a newsfeed may result in one or more text-based articles in the newsfeed being selected. For instance, if a newsfeed includes 5 text-based articles, selection of the newsfeed may cause the selection of all 5 text-based articles therein.

At step 608, client device 102 may transmit URLs of the selected text-based articles to server device 104. Alternatively or additionally, this transmission may include copies of part or all of the text-based articles. Steps 604, 606, and 608 may occur two or more times in succession. For instance, the user may select a first group of text-based articles, the URLs of which are transmitted to server device 104, then later refresh the RSS data on client device 102, and select a second group of text-based articles, the URLs of which are also transmitted to server device 104.

At step 610, server device 104 may request the text-based articles from newsfeed server(s) 602. At step 612, newsfeed server(s) 602 may provide copies of the text-based articles to server device 104. Steps 610 and 612 may involve server device 104 requesting and receiving one or more text-based articles from at least one of newsfeed server(s) 602.

Message flow diagram 620 of FIG. 6B depicts conversion of selected text-based articles to audio files and streaming of the audio files. These activities may involve client device 102, server device 104, and TTS system or recording studio server 622 (which will be referred to as server 622). Server 622 may be an automated server device that provides conversion of text-based articles to computer-generated speech and/or a server device in a physical location at which a human speaker verbally records audio files containing the content of the text-based articles. The steps of message flow diagram 620 may take place after the steps of message flow diagram 600 complete.

At step 624, server device 104 may transmit text-based articles to server 622. Alternatively, URLs referencing these articles may be transmitted instead. In response, server 622 may be involved in a TTS or verbal conversion of the text-based articles to audio files.

At step 626, server 622 may transmit representations of these audio files to server device 104. In some cases, these representations may be the audio files themselves, and in other cases, server 622 may store the audio files on a file server device, and the representations may be references to the audio files as stored (e.g., URLs).

At step 628, server device 104 may provide a playlist referencing the stored audio files to client device 102. In some embodiments, server device 104 may transmit an indication to client device 102 that the playlist is ready, and client device 102 may later retrieve the playlist from server device 104. In some examples, the server device 104 may sequence the playlist in chronological order (or in reverse chronological order) according to the respective publication times of each of the text-based articles selected from the newsfeed server(s) 602. As such, the publication times of each text-based article may be provided to the server device 104 in connection with step 612 (e.g., the <lastBuildDate> element and/or <pubDate> element discussed above). Moreover, in some examples, the server device 104 may sequence the playlist in order of the relative priority of each of the selected articles and/or newsfeeds (e.g., as specified by user preferences information).

At step 630, which may take place some number of seconds, minutes, hours, or days after step 628, client device 102 determines that it is ready for the playout of the audio files. In some embodiments, this may involve the user of client device 102 requesting, by way of a user interface on client device 102, the playout of the audio files.

At step 632, client device 102 may transmit a request for streaming of the audio file(s). While this request is shown being sent to server device 104 in message flow diagram 620, this request could be sent to a separate file server instead in the case that the audio files are stored on that server.

At step 634, server device 104 (or a separate file server) may transmit a stream of the requested audio files to client device 102. Once the stream of each particular audio file has arrived at client device 102, client device 102 may begin playout of the stream. In some embodiments, steps 632 and 634 may include one or more additional sub-steps in accordance with the streaming shown in message flow diagram 504.

In message flow diagram 620, a client device other than client device 102 may carry out the operations of client device 102. For instance, an in-car audio system may take the place of client device 102 in this message flow diagram. Doing so allows the user to specify the text-based articles and/or audio files on one device, then receive and play out the corresponding audio files on another device.

Figure 7:
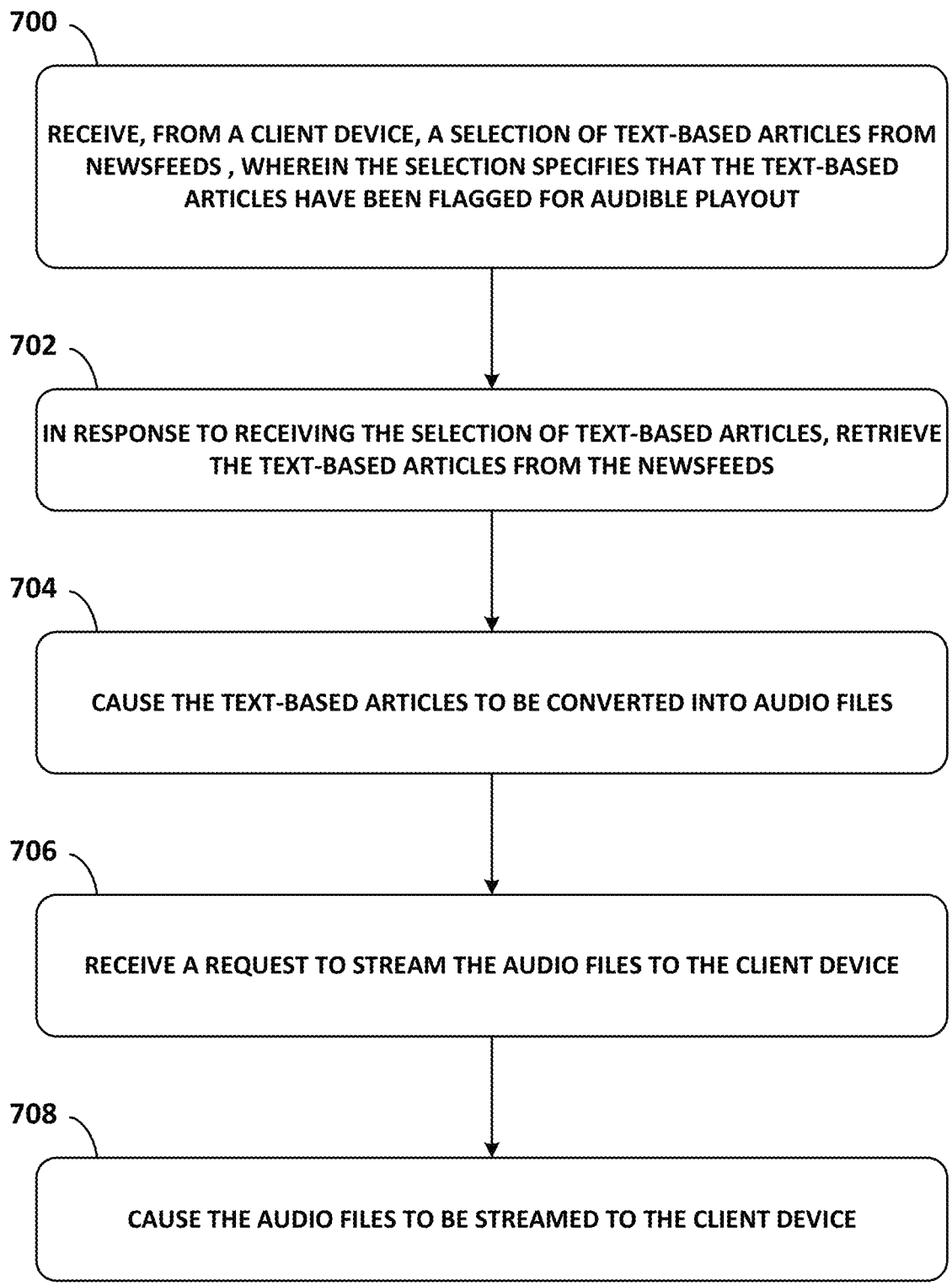
FIG. 7 is a flow chart, according to an example embodiment.

FIG. 7 is a flow chart illustrating an example embodiment. The process illustrated by FIG. 7 may be carried out by a server device, such as computing device 200, and/or a cluster of computing devices, such as server cluster 304. However, the process can be carried out by other types of devices or device subsystems.

The embodiments of FIG. 7 may be simplified by the removal of any one or more of the features shown therein. Further, these embodiments may be combined with one another, as well as features, aspects, and/or implementations of any of the previous figures or otherwise described herein.

A. Receiving a Selection of Text-Based Articles from Newsfeeds

Block 700 may involve receiving a selection of text-based articles from newsfeeds. The selection specifies that the text-based articles have been flagged for audible playout. The newsfeeds may be RSS newsfeeds or some other type of newsfeed.

B. Retrieving the Text-Based Articles from the Newsfeeds

Block 702 may involve, possibly in response to receiving the selection of text-based articles, retrieving the text-based articles from the newsfeeds. The newsfeeds may be hosted by a plurality of server devices. Thus, retrieving the text-based articles from the newsfeeds may involve accessing each of the plurality of server devices to obtain the text-based articles. Additionally, retrieving the text-based articles from the newsfeeds may involve retrieving multiple text-based articles from at least one of the newsfeeds.

C. Causing the Text-Based Articles to be Converted into Audio Files

Block 704 may involve causing the text-based articles to be converted into audio files. A particular one of the retrieved text-based articles may include a title and a body. Thus, retrieving the text-based articles from the newsfeeds may involve retrieving the title and the body, and causing the text-based articles to be converted into audio files may involve causing the title and the body to be converted into an audio file.

In some embodiments, causing the text-based articles to be converted into the audio files may involve providing the text-based articles to a TTS system. Reception of the text-based articles by the TTS system causes the TTS system to convert the text-based articles to the audio files. Causing the text-based articles to be converted into the audio files may further involve receiving the audio files from the TTS system.

Alternatively or additionally, causing the text-based articles to be converted into the audio files may involve providing the text-based articles to a recording studio for verbal readings, and receiving the audio files from the recording studio. The audio files may contain recordings of the verbal readings of the text-based articles.

D. Receiving a Request to Stream the Audio Files and Causing the Audio Files to be Streamed to the Client Device Block 706 may involve receiving a request to stream the audio files to the client device. Block 708 may involve causing the audio files to be streamed to the client device.

This streaming may use a playlist in accordance with that of FIG. 5A, and may involve communication in accordance with that of FIG. 5B.

In some embodiments, causing the audio files to be streamed to the client device may involve inserting, into the stream, a musical interlude between two of the audio files. This musical interlude may be appended to one or more of the audio files, or may be included in one or more separate audio files.

In these or other embodiments, the request to stream the audio files to the client device indicates that the client device is in an automobile. In these situations, causing the audio files to be streamed to the client device may occur based on the client device being in an automobile. This streaming may occur in accordance with the embodiments of either of FIGS. 4A and 4B, as well as FIG. 5B.

6. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
    retrieving, by a server device, a plurality of text-based articles and respective dates for each of the text-based articles from one or more newsfeed servers;
    causing, by the server device, the text-based articles to be converted into audio files;
    receiving, by the server device, a request to stream the audio files to a client device;
    generating, by the server device, a playlist with references to the audio files ordered chronologically or reverse-chronologically according to the respective dates of their associated text-based articles; and
    transmitting, to the client device, the playlist.

2. The method of claim 1, wherein the text-based articles were selected from one or more markup language files provided by the one or more newsfeed servers.

3. The method of claim 2, wherein the one or more newsfeed servers provide really simple syndication (RSS) newsfeeds.

4. The method of claim 1, wherein retrieving the text-based articles from the one or more newsfeed servers comprises retrieving multiple text-based articles from at least one of the one or more newsfeed servers.

5. The method of claim 1, wherein retrieving the text-based articles and the respective dates of each of the text-based articles comprises:
    retrieving the text-based articles from the one or more newsfeed servers; and obtaining the respective dates of each of the text-based articles from content within the text-based articles.

6. The method of claim 1, wherein a retrieved text-based article includes a title and a body, and wherein retrieving the text-based articles comprises retrieving the title and the body, and wherein causing the text-based articles to be converted into the audio files comprises causing the title and the body to be converted into audio and included in an audio file.

7. The method of claim 1, wherein causing the text-based articles to be converted into the audio files comprises:
   providing the text-based articles to a text-to-speech (TTS) system, wherein reception of the text-based articles by the TTS system causes the TTS system to convert the text-based articles to the audio files; and
   receiving the audio files from the TTS system.

8. The method of claim 1, wherein causing the text-based articles to be converted into the audio files comprises:
   providing the text-based articles to a recording studio for verbal readings by a human speaker; and
   receiving the audio files from the recording studio, wherein the audio files contain recordings of the verbal readings of the text-based articles.

9. The method of claim 1, wherein receiving the playlist causes the client device to:
   request a stream of at least some of the audio files according to the ordering; and
   receive and play out the stream of the audio files as requested.

10. The method of claim 1, wherein the request to stream the audio files to the client device indicates that the client device is in an automobile, and wherein receiving and playing out the stream of the audio files as requested occurs based on the client device being in the automobile.

11. An article of manufacture including a non-transitory computer-readable medium, having stored thereon program instructions that, upon execution by a computing device, cause the computing device to perform operations comprising:
   retrieving a plurality of text-based articles and respective dates for each of the text-based articles from one or more newsfeed servers;
   causing the text-based articles to be converted into audio files;
   receiving a request to stream the audio files to a client device;
   generating a playlist with references to the audio files ordered chronologically or reverse-chronologically according to the respective dates of their associated text-based articles; and
   transmitting, to the client device, the playlist.

12. The article of manufacture of claim 11, wherein the text-based articles were selected from one or more markup language files provided by the one or more newsfeed servers.

13. The article of manufacture of claim 11, wherein retrieving the text-based articles from the one or more newsfeed servers comprises retrieving multiple text-based articles from at least one of the one or more newsfeed servers.

14. The article of manufacture of claim 11, wherein retrieving the text-based articles and the respective dates of each of the text-based articles comprises:
   retrieving the text-based articles from the one or more newsfeed servers; and
   obtaining the respective dates of each of the text-based articles from content within the text-based articles.

15. The article of manufacture of claim 11, wherein a retrieved text-based article includes a title and a body, and wherein retrieving the text-based articles comprises retrieving the title and the body, and wherein causing the text-based articles to be converted into the audio files comprises causing the title and the body to be converted into audio and included in an audio file.

16. The article of manufacture of claim 11, wherein causing the text-based articles to be converted into the audio files comprises:
   providing the text-based articles to a text-to-speech (TTS) system, wherein reception of the text-based articles by the TTS system causes the TTS system to convert the text-based articles to the audio files; and
   receiving the audio files from the TTS system.

17. The article of manufacture of claim 11, wherein causing the text-based articles to be converted into the audio files comprises:
   providing the text-based articles to a recording studio for verbal readings by a human speaker; and
   receiving the audio files from the recording studio, wherein the audio files contain recordings of the verbal readings of the text-based articles.

18. The article of manufacture of claim 11, wherein receiving the playlist causes the client device to:
   request a stream of at least some of the audio files according to the ordering; and
   receive and play out the stream of the audio files as requested.

19. The article of manufacture of claim 11, wherein the request to stream the audio files to the client device indicates that the client device is in an automobile, and wherein receiving and playing out the stream of the audio files as requested occurs based on the client device being in the automobile.

20. A computing device comprising:
   a processor;
   memory; and
   program instructions, stored in the memory, that upon execution by the processor cause the computing device to perform operations comprising:
      retrieving a plurality of text-based articles and respective dates for each of the text-based articles from one or more newsfeed servers;
      causing the text-based articles to be converted into audio files;
      receiving a request to stream the audio files to a client device;
      generating a playlist with references to the audio files ordered chronologically or reverse-chronologically according to the respective dates of their associated text-based articles; and
      transmitting, to the client device, the playlist.

* * * * *